United States Patent [19]

Blanchet et al.

[11] Patent Number: 4,497,628

[45] Date of Patent: Feb. 5, 1985

[54] DESIGN OF TRANSVERSE-BURNER RECUPERATIVE FURNACES

[75] Inventors: Pierre Blanchet, Boulogne; Joseph Recasens, Sorgues, both of France

[73] Assignee: Societe Europeenne des Produits Refractaires, Courbevoie, France

[21] Appl. No.: 480,672

[22] Filed: Mar. 31, 1983

[30] Foreign Application Priority Data

Apr. 2, 1982 [FR] France .................. 82 05723

[51] Int. Cl.³ .................. C03B 5/16; C27D 17/00; F23C 5/08
[52] U.S. Cl. .................. 432/179; 65/346; 431/178; 431/181; 432/120
[58] Field of Search .......... 432/120, 179; 431/178, 431/179, 181, 187; 65/347, 336, 337, 346

[56] References Cited

U.S. PATENT DOCUMENTS

| 2,532,671 | 12/1950 | Lientz | 431/181 |
| 3,133,803 | 5/1964 | Denman | 65/347 |
| 3,523,781 | 8/1970 | Leveque | 65/337 |
| 4,260,364 | 4/1981 | Young et al. | 431/187 |

Primary Examiner—John J. Camby
Attorney, Agent, or Firm—Watson, Cole, Grindle & Watson

[57] ABSTRACT

A transverse-burner recuperative furnace for glass making, which comprises burner blocks of which the inner aperture, of generally elongate rectangular shape, exhibits a first portion of constant cross-section extending from the rear face of the burner block, and a second portion progressively flaring upwards and downwards to the front face of the burner block, such second portion exhibiting an angle of flare $\alpha$ of not more than 15°, and the cumulated total length of these apertures representing at least 0.65 times the distance between the extreme burner blocks.

10 Claims, 7 Drawing Figures

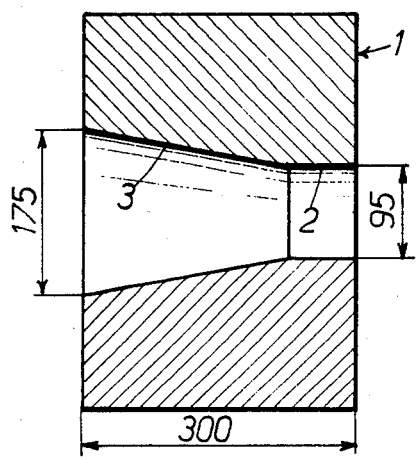
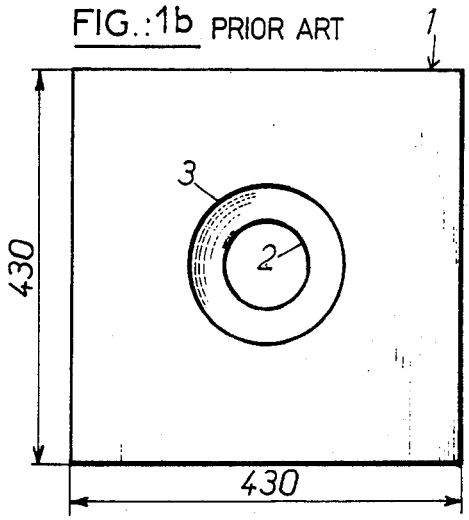
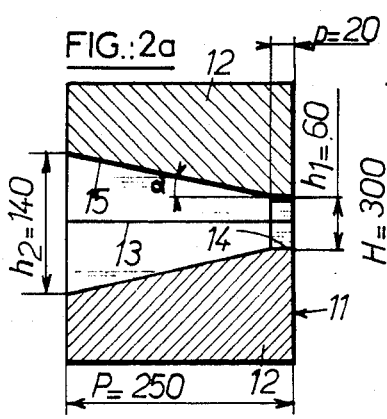
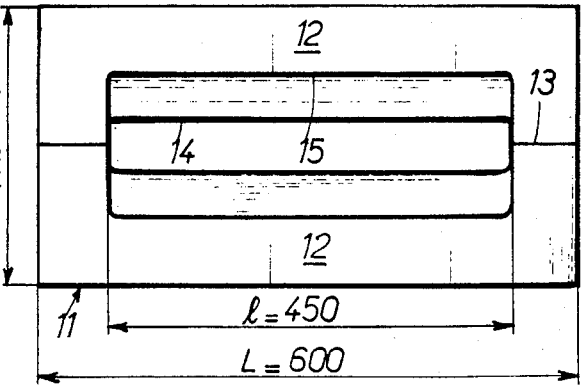

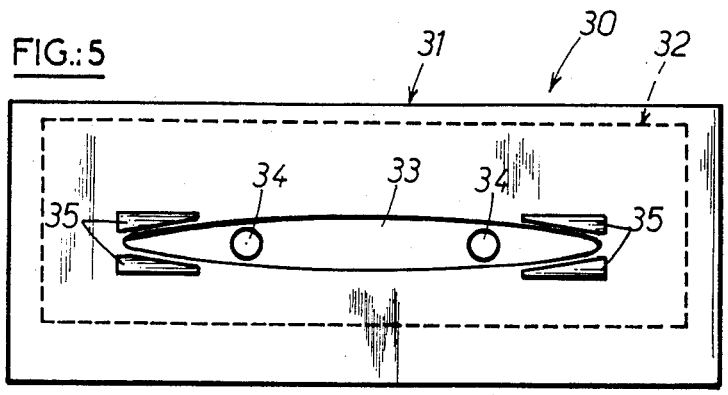
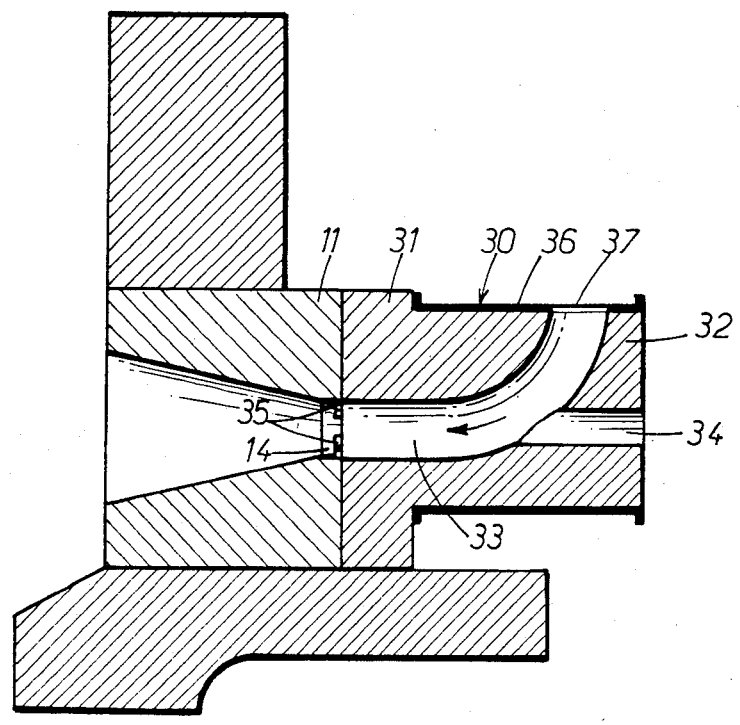

DESIGN OF TRANSVERSE-BURNER RECUPERATIVE FURNACES

The invention relates to improvements in the design of transverse-burner recuperative furnaces.

Transverse-burner recuperative furnaces are well known in glass-making. In furnaces of this type, the burners are arranged face to face on the sides of the furnace and operate simultaneously and continuously. These burners consist of metallic shells fixed on refractory burner blocks, which are in turn housed in the piedroit of the furnace. The flames are diffusion flames of the axial type, the fuel entering through an injector in the center of the airstream. The combustion air, which has been preheated by a recuperator, reaches each shell and is distributed round this injector or "rod" through which the fuel (gas or fuel oil) is fed. The shape of the inner aperture of the refractory burner blocks is customarily frustoconical to permit good adhesion of the flame. The actual recuperator, consisting of customarily metallic pipes in which the air to be heated circulates, is placed at the end of the smoke discharge pipe at one end of the furnace.

Although transverse-burner recuperative furnaces consume more energy than regenerative furnaces, they are used for the production of special glasses, the vapors of which are too corrosive to permit the use of regenerative furnaces. In fact, the regenerators consist of refractory materials having poor resistance to this corrosive action.

The recuperative furnaces currently known present various disadvantages:
  poor flame cover, particularly at the root. The heat exchange and hence the fuel efficiency and therefore the consumption of the furnace depend upon the flame cover percentage;
  high air velocities: (most frequently 40 to 100 m/sec). These air velocities, which are attributable to the necessarily small cross-section of the burner blocks, induce strong recirculation currents which in turn impair the endurance of the superstructure refractories (mechanical erosion, pieces flying off . . . );
  a relatively small heat-insulatable piedroit surface due to the considerable space occupied by the metallic shells.

This invention relates to improvements in the design of transverse-burner recuperative furnaces, aiming to overcome or to minimize these disadvantages.

The invention relates more particularly to a transverse-burner recuperative furnace comprising burner blocks, of which the inner aperture, of generally elongate rectangular shape, exhibits a first portion of constant cross-section extending from the rear face of the burner block, and a second portion progressively flaring upwards and downwards to the front face of the burner block, this second portion exhibiting an angle of flare of not more than 15°, and the cumulated total length of these apertures representing at least 0.65 times, preferably 0.70 times, the distance between the extreme burner blocks.

According to a particular embodiment, each burner block is formed by two identical half-pieces of refractory material, the one forming the lower lip and the other the upper lip, and separated by a horizontal joint.

The aperture preferably exhibits an elongate rectangular cross-section such that the length:height ratio of this aperture is equal to at least 2.5, preferably at least 3.

The angle of flare must not exceed 15°, because beyond this it is no longer possible for the flame to adhere to the walls of the inner aperture. The angle of flare is preferably approximately 10°.

The first part of the aperture generally extends over a distance not exceeding 0.2 times, preferably 0.1 times, the total depth of the burner block.

Molten and cast refractories based on alumina, or alumina, zirconia and silica, or alumina, zirconia, silica and chrome oxide, may be mentioned as refractory materials suitable for the construction of the burner blocks of the invention. Materials of this type are supplied commercially by the applicant under the designation E.R. 1681 ($Al_2O_3$-$ZrO_2$-$SiO_2$ based product), E.R. 5312 (alumina-based product) or E.R. 2161 ($Al_2O_3$-$ZrO_2$-$SiO_2$-$Cr_2O_3$ based product).

The metallic pipes or shells of the air inlet and fuel injection blocks may be connected directly to the rear faces of the burner blocks. However, depending upon the type of glass to be treated and the operative conditions adopted, it may occur that the rear faces of the burner blocks are raised to excessive temperatures. In this case a direct connection should be avoided, and it is provided according to the invention to arrange an intermediate block between the burner blocks and the pipes or shells. This block, which may particularly be produced by forming and baking an unshaped refractory composition, is provided with internal ducts connectable respectively to the air inlet and fuel injection pipes and converging into a duct connectable to the aperture leading to the rear face of the burner block.

In a preferred embodiment, the intermediate block is provided with a metallic jacket on at least a part of its upper, lateral and lower faces.

In the case of blocks produced by forming an unshaped composition, the materials preferred for the production of these intermediate blocks are sinterable compositions described in U.S. Pat. No. 4,308,067, particularly those called "for joints of over 25 mm" and particularly composition C of table 2. Other compositions may obviously also be used.

The furnace of the invention exhibits a number of advantages compared to a conventional furnace:
  increase in the flame cover, particularly at the root, because the cumulated total length of the rectangular apertures of the burner blocks represents at least 0.65 times the distance between the extreme burner blocks;
  reduction in the air velocity at the inlet to the laboratory. The burner blocks of the invention permit the obtention of air velocities of the order of 20 m/sec. as a maximum, instead of the 50 to 100 m/sec. experienced with conventional burners. These lower velocities are expressed as less flying and better endurance of the superstructure;
  better heat insulation is possible due to an enlarged heat-insulatable surface of the piedroits, since the burner blocks of the invention have a smaller height than the conventional burner blocks.

The description which follows with reference to the accompanying drawings, given by way of example and not implying a limitation, will clearly show how the invention may be performed.

FIGS. 1a and 1b are views in elevation and in cross-section of a conventional burner block.

FIGS. 2a and 2b are views in elevation and in cross-section of a burner block according to the invention.

FIG. 4 is a partial view in section of an embodiment of the superstructure of a furnace piedroit according to the invention, wherein an intermediate block is provided between the burner blocks and the air inlet and fuel injection pipes.

FIG. 5 is a view in elevation of the front face of the intermediate block of FIG. 4.

Figure 3:
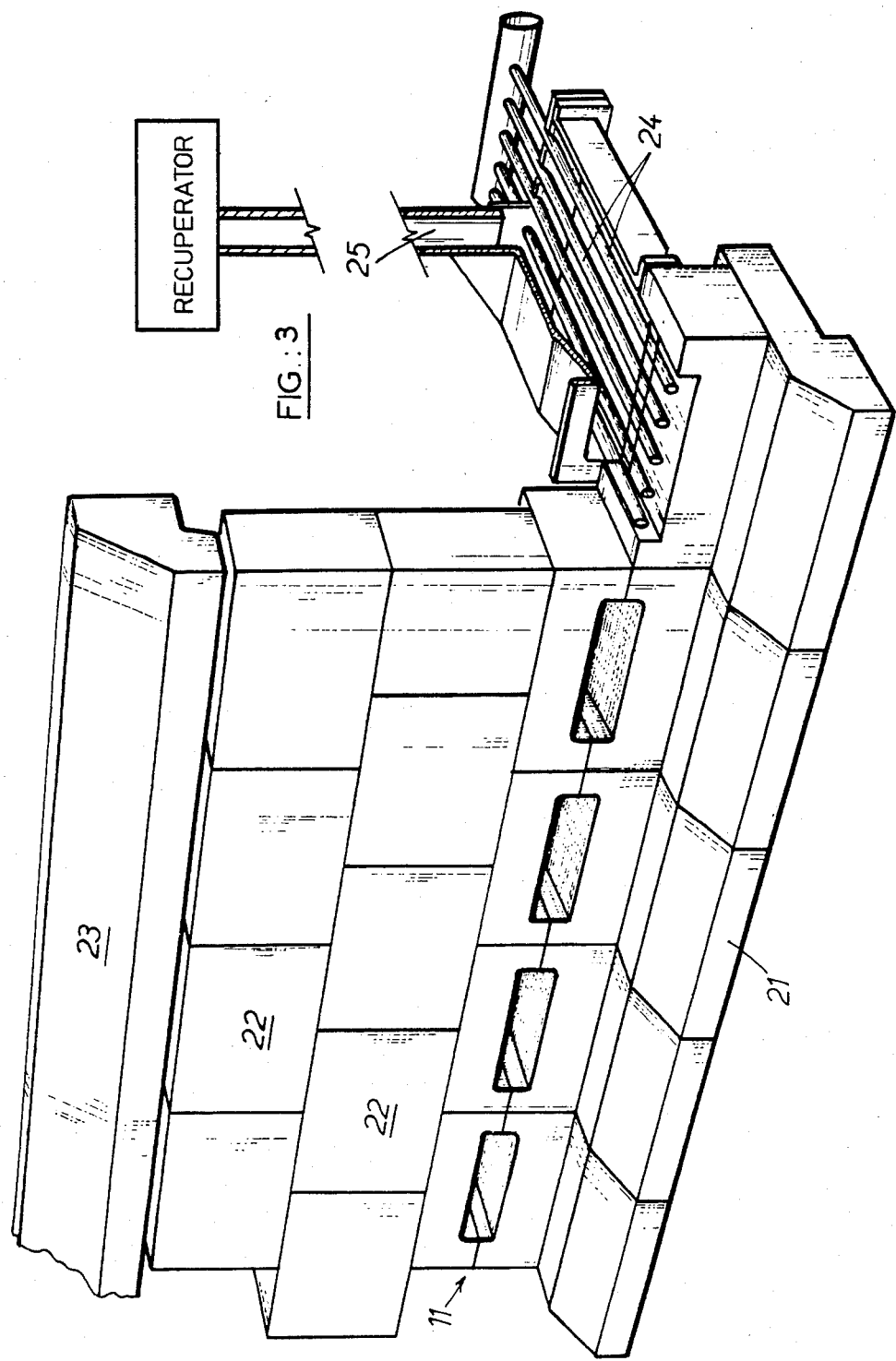
FIG. 3 shows diagrammatically and partially, in perspective with partial fragmentation, the superstructure of one of the piedroits of a recuperative furnace according to the invention, equipped with burner blocks such as the burner block of FIGS. 2a and 2b.

FIGS. 1a and 1b illustrate a typical conventional burner block. This burner block 1 exhibits square front and rear faces and an inner aperture comprising, from the rear to the front, a cylindrical first portion 2 and a frustoconical second portion 3. The burner block generally consists of a molded one-piece refractory block. The burner block typically has a length and a height of 430 mm and a depth of 300 mm. The diameter of the first portion of the aperture is typically 95 mm, while the maximum diameter of the second portion is 175 mm.

A burner block according to the invention is illustrated in FIGS. 2a and 2b. This burner block 11 is formed by two molded half-pieces 12 of refractory material, identical in shape, arranged face to face with a horizontal joint 13. The resulting burner block has the form of a rectangular parallelepiped and is provided with an aperture of generally elongate rectangular shape, formed, from the rear to the front, by a first portion 14 of constant cross-section and by a second portion 15 progressively flaring upwards and downwards at an angle of flare $\alpha$ of 10°. The corners of the aperture are preferably rounded, as shown. The dimensions of this burner block are typically as follows: total length L: 600 mm, height H: 300 mm, depth P: 250 mm. Length L of the aperture: 450 mm (that is to say, 0.75 times the total length of the burner block), height $h_1$ of the first portion: 60 mm, and height $h_2$ of the second portion at the level of the front face: approximately 140 mm, which corresponds to a length/height ratio of approximately 3.2. The first portion extends to a depth p of 20 mm and its presence is necessary for the connection of the metallic fluid inlet chest (not shown).

If it were desired to increase the height of the rectangular aperture, this could be achieved very easily by interposing a distance piece or strut between the two half-pieces 12.

FIG. 3 shows diagrammatically and partially the superstructure of one of the piedroits of a recuperative furnace according to the invention, constructed by means of burner blocks similar to that of FIGS. 2a and 2b.

This superstructure comprises at its base a row of nose blocks 21 upon which the improved burner blocks 11 of the invention rest contiguously, then, for example, two rows of refractory blocks 22 (one or more rows of blocks 22 may be provided as required). Above the last row of these blocks, is the transom 23 supporting the vault of the furnace (not shown), this transom 23 being itself supported, as is customary, by a metallic bracing (not shown). On the right of the Figure, the upper half-piece 12 of the burner block, and the refractory blocks surmounting it, have been omitted in order to show the actual burner. This burner is formed by fuel injectors 24 leading into the aperture of each burner block, and of a combustion air inlet 25, similar to those of the conventional recuperative furnaces. The injectors 24 have been illustrated diagrammatically in order to simplify the illustration.

A typical furnace according to the invention, of which the distance between the extreme burners is equal to 7.20 m, comprises 12 burner blocks (only 5 of them are shown in FIG. 3) and exhibits a linear length of burners of 12×0.45 = 5.40 meters. This corresponds to a flame cover percentage at the root of (5.4/7.2) = 75%.

On the contrary, a conventional furnace having a distance between extreme burners similar to the above and comprising 12 conventional burner blocks exhibits a flame cover length at the root of 12×0.17 = 2.10 meters. It should be noted that in the conventional furnaces the successive burner blocks are not contiguous, but separated by intermediate refractory blocks. This corresponds to a flame cover percentage at the root of 29%, which is almost three times less than in the case of the furnace of the invention.

The furnace of the invention likewise exhibits a larger piedroit surface to be heat-insulated. The burner blocks of the invention have a height of 300 mm as against 430 mm for the conventional burner blocks. Since it is impossible to heat-insulate between the burners, in either furnace, the nett gain is equal to the difference between the heights, (430–300), multiplied by the distance between the extreme burners. This gain in heat-insulatable surface is estimated as approximately 25% of the total piedroit surface, which is by no means negligible.

FIGS. 4 and 5 illustrate a variant of embodiment according to the invention, according to which an intermediate block 30 formed from a moldable refractory composition is arranged between the burner blocks 11 according to the invention and the metallic air inlet and fuel injection pipes or shells (not shown).

This block is produced by molding of a refractory composition corresponding to product C of table 2 of U.S. Pat. No. 4,308,067, and sintering of this composition.

This block 30 exhibits, at its front part 31, similar dimensions to those of the adjacent burner block and, at its rear part 32, smaller dimensions, as clearly shown in FIG. 5, in which the contour of the rear face of the block 30 has been shown by dash lines. This permits the lightening of the piece on the one hand, and easier positioning on the other hand. Each block 30 comprises an air inlet pipe 33 of elliptical cross-section and two fuel (for example, gas) injection pipes 34. The pipes 34 lead into the pipe 33, as shown. Four projections 35, generally shaped as right-angled triangles, are provided integrally molded on the front face of each block 30. These projections frame the elliptical outlet of the pipe 33 and are spaced so that each of them is just embedded in the portion 14 of the burner blocks 11. A metallic jacket 36, for example of steel, is provided round the rear part 32 of the block. This jacket is provided with an elliptical aperture 37 in the position of the inlet of the pipe 33. The metallic jacket serves to protect the rear part of the block, and also permits the air inlet pipe to be connected by welding.

Obviously, the embodiments described are only examples, and it would be possible to modify them, particularly by substitution of equivalent technical means, without thereby departing from the ambit of the invention.

We claim:

1. In a transverse-burner recuperative furnace for melting glass, which comprises a hearth, a vault, tank walls, two piedroits (or casing walls) extending upwardly from the tank walls to the vault and supporting same, each of said piedroits copmrising, above the molten glass level, a row of burner blocks each connected to an air inlet and to at least one fuel injection pipe, and a recuperator for preheating the air fed to said burner blocks, the improvement wherein said burner blocks have inner apertures each of generally elongate rectangular shape, each said aperture presenting a first block portion of constant cross-section extending from the rear face of the burner block, and each said aperture presenting a second block portion progressively flaring upwards and downwards to the front face of the burner block, said second portion having an angle of flare of not more than 15 degrees, and the cumulated total length of said apertures representing at least 0.65 times the length of said row of burner blocks.

2. A furnace as claimed in claim 1, wherein each said burner block is formed by two identical half-pieces of refractory material, one of said pieces forming the lower lip and the other of said pieces forming the upper lip, and said lips being separated by a horizontal joint.

3. A furnace as claimed in claim 1, wherein each said aperture exhibits an elongate rectangular cross-section such that the length: height ratio thereof is equal to at least 2.5.

4. A furnace as claimed in claim 1, wherein the cumulated total length of the apertures represents at least 0.7 times the length of said row of burner blocks.

5. A furnace as claimed in claim 1, wherein the first portion of the aperture extends over a distance not exceeding 0.2 times the total depth of the burner block.

6. A furnace as claimed in claim 5, wherein said first portion extends over a distance not exceeding 0.1 times the total depth of the burner block.

7. A furnace as claimed in claim 1, which further comprises an intermediate block of molded refractory material, provided with internal ducts connectable respectively to the air inlet and fuel injection pipes and converging into a duct connectable to the rear aperture of the burner block.

8. A furnace as claimed in claim 7, wherein the intermediate block is provided with a metallic jacket on at least a part of its upper, lateral and lower faces.

9. A furnace as claimed in claim 7, wherein the internal duct connectable to the air inlet pipes and the internal duct connectable to the aperture of the rear face of the burner block are in mutual extension and have an elliptical cross-section.

10. A furnace as claimed in claim 7, wherein said intermediate block comprises a front face provided with projections embedded within the first portion of constant cross-section of said burner block.

* * * * *